(12) United States Patent
Tamaki et al.

(10) Patent No.: US 11,495,029 B2
(45) Date of Patent: Nov. 8, 2022

(54) ESTIMATION DEVICE, ESTIMATION METHOD, AND STORAGE MEDIUM

(71) Applicant: HONDA MOTOR CO., LTD., Tokyo (JP)

(72) Inventors: Takeshi Tamaki, Wako (JP); Akinori Oi, Wako (JP); Takahiro Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 132 days.

(21) Appl. No.: 17/020,860

(22) Filed: Sep. 15, 2020

(65) Prior Publication Data

US 2021/0089795 A1 Mar. 25, 2021

(30) Foreign Application Priority Data

Sep. 19, 2019 (JP) .............................. JP2019-170577

(51) Int. Cl.
*G06V 20/58* (2022.01)
*G06V 10/25* (2022.01)

(52) U.S. Cl.
CPC .............. *G06V 20/58* (2022.01); *G06V 10/25* (2022.01)

(58) Field of Classification Search
CPC ................................ G06V 20/58; G06V 10/25
See application file for complete search history.

(56) References Cited

U.S. PATENT DOCUMENTS

| 2013/0010112 | A1* | 1/2013 | Goto | H04N 7/18 |
| | | | | 348/148 |
| 2017/0147891 | A1* | 5/2017 | Satzoda | H04N 7/181 |
| 2017/0262727 | A1* | 9/2017 | Kozu | G06V 10/44 |
| 2018/0032824 | A1* | 2/2018 | Yamamoto | B60R 1/00 |
| 2018/0075309 | A1* | 3/2018 | Sathyanarayana | G06V 40/20 |
| 2019/0276013 | A1* | 9/2019 | Kim | B60W 50/0097 |

FOREIGN PATENT DOCUMENTS

| JP | 2015-141553 | 8/2015 |
| JP | 2018-045482 | 3/2018 |
| JP | 2018-173817 | 11/2018 |

OTHER PUBLICATIONS

Japanese Office Action for Japanese Patent Application No. 2019-170577 dated May 10, 2022.

* cited by examiner

*Primary Examiner* — Pinalben Patel
(74) *Attorney, Agent, or Firm* — Amin, Turocy & Watson, LLP

(57) ABSTRACT

An estimation device includes a recognition unit configured to recognize a surrounding environment of a moving object in recognition regions, and an estimation unit configured to estimate a risk for the moving object on the basis of a recognition result from the recognition unit, in which the recognition unit sets a priority region on which a recognition process is preferentially performed among the recognition regions, according to a state of the surrounding environment of the moving object, and sets, as the priority region, a region overlapping a region including at least a part of at least one crosswalk that is present in a vicinity of an intersection region in which a first road on which the moving object is located intersects a second road present in an advancing direction of the moving object.

14 Claims, 10 Drawing Sheets

ESTIMATION DEVICE, ESTIMATION METHOD, AND STORAGE MEDIUM

CROSS-REFERENCE TO RELATED APPLICATION

Priority is claimed on Japanese Patent Application No. 2019-170577, filed Sep. 19, 2019, the content of which is incorporated herein by reference.

BACKGROUND OF THE INVENTION

Field of the Invention

The present invention relates to an estimation device, an estimation method, and a storage medium.

Description of Related Art

Research and practical application for causing a vehicle to automatedly travel (hereinafter, referred to as automated driving) have progressed. In automated driving, a technique has been disclosed in which a target object present in a recognition region is detected, and a vehicle is caused to travel in order to avoid the detected target object (for example, Japanese Unexamined Patent Application, First Publication No. 2015-141553 and Japanese Unexamined Patent Application, First Publication No. 2018-173817).

SUMMARY OF THE INVENTION

Here, in automated driving, there is a case where it is necessary to perform a recognition process on a traffic participant at an intersection with high accuracy. However, in the related art, it is difficult to perform a recognition process on a traffic participant at an intersection with high accuracy without greatly increasing a processing load.

Aspects related to the present invention have been made in consideration of these circumstances, and one object thereof is to provide an estimation device, an estimation method, and a recording medium capable of performing a recognition process on a traffic participant at an intersection with high accuracy without greatly increasing a processing load.

In order to solve the problem and to achieve the object, the present invention employs the following aspects.

(1) According to an aspect of the present invention, there is provided an estimation device including a recognition unit configured to recognize a surrounding environment of a moving object in recognition regions; and an estimation unit configured to estimate a risk for the moving object on the basis of a recognition result from the recognition unit, in which the recognition unit sets a priority region on which a recognition process is preferentially performed among the recognition regions, according to a state of the surrounding environment of the moving object, and sets, as the priority region, a region overlapping a region including at least a part of at least one crosswalk that is present in a vicinity of an intersection region in which a first road on which the moving object is located intersects a second road present in an advancing direction of the moving object.

(2) In the estimation device according to the aspect of the above (1), the recognition unit may set the priority region with an intersection position where the advancing direction of the moving object intersects the at least one crosswalk as a reference.

(3) In the estimation device according to the aspect of the above (1) or (2), the recognition unit may enlarge a range of the priority region as a speed of the moving object becomes lower.

(4) In the estimation device according to any one of the aspects of the above (1) to (3), the estimation unit may perform a first estimation process of estimating a risk for the priority region, and perform a second estimation process of estimating risks for regions other than the priority region among the recognition regions after performing the first estimation process.

(5) In the estimation device according to the aspect of the above (4), the recognition unit may recognize the surrounding environment on the basis of an image generated through imaging in a camera, the estimation unit may perform the first estimation process by using a first image obtained by the camera imaging the priority region, and performs the second estimation process by using a second image obtained by the camera imaging regions other than the priority region among the recognition regions, and an information amount of the second image may be smaller than an information amount of the first image.

(6) In the estimation device according to any one of the aspects of the above (1) to (5), the recognition unit may enlarge the priority region as a degree of turning of a target trajectory becomes larger on the basis of the target trajectory of the moving object.

(7) In the estimation device according to any one of the aspects of the above (1) to (6), the estimation unit may estimate a risk related to a traffic participant that is advancing toward the priority region and is estimated to enter the priority region in a predetermined time period centering on a time point at which the moving object reaches the priority region.

(8) In the estimation device according to the aspect of the above (7), the estimation unit may identify an attribute of the traffic participant on the basis of a recognition result from the recognition unit, and change a length of the predetermined time period according to the identified attribute.

(9) In the estimation device according to any one of the aspects of the above (1) to (8), the recognition unit may recognize the surrounding environment of the moving object further on the basis of a recognition result of the priority region being recognized by a periphery monitoring device provided on a sidewalk close to the priority region.

(10) In the estimation device according to any one of the aspects of the above (1) to (9), the recognition unit may set a plurality of the priority regions according to a target trajectory of the moving object and a vehicle speed of the moving object.

(11) According to another aspect of the present invention, there is provided an estimation method of causing a computer to recognize a surrounding environment of a moving object in recognition regions; estimate a risk for the moving object on the basis of a recognition result; set a priority region on which a recognition process is preferentially performed among the recognition regions, according to a state of the surrounding environment of the moving object; and set, as the priority region, a region overlapping a region including at least a part of at least one crosswalk that is present in a vicinity of an intersection region in which a first road on which the moving object is located intersects a second road present in an advancing direction of the moving object.

(12) According to still aspect of the present invention, there is provided a non-transitory computer readable storage medium storing a program causing a computer to recognize a surrounding environment of a moving object in recognition regions; estimate a risk for the moving object on the basis of a recognition result; set a priority region on which a recognition process is preferentially performed among the recognition regions, according to a state of the surrounding environment of the moving object; and set, as the priority region, a region overlapping a region including at least a part of at least one crosswalk that is present in a vicinity of an intersection region in which a first road on which the moving object is located intersects a second road present in an advancing direction of the moving object.

According to the aspects of the above (1) to (12), it is possible to perform a recognition process on a traffic participant at an intersection with high accuracy without greatly increasing a processing load.

According to the aspect of the above (3), it is possible to perform a recognition process according to a state of a moving object.

According to the aspect of the above (4), it is possible to preferentially perform a recognition process on a range in which courses are estimated to intersect each other.

According to the aspect of the above (5), it is possible to reduce a processing load of a recognition process on a recognition region other than a recognition region related to a traffic participant.

According to the aspect of the above (6), it is possible to perform a recognition process on a range that is hardly recognized with higher accuracy.

According to the aspect of the above (7), it is possible to perform a recognition process on a traffic participant of which a course is estimated to intersect an own vehicle, with high accuracy.

According to the aspect of the above (8), it is possible to perform a recognition process according to a feature of a traffic participant.

DETAILED DESCRIPTION OF THE INVENTION

Hereinafter, with reference to the drawings, an estimation device, an estimation method, and a storage medium according to an embodiment of the present invention will be described.

Embodiment

Overall Configuration

Figure 1:
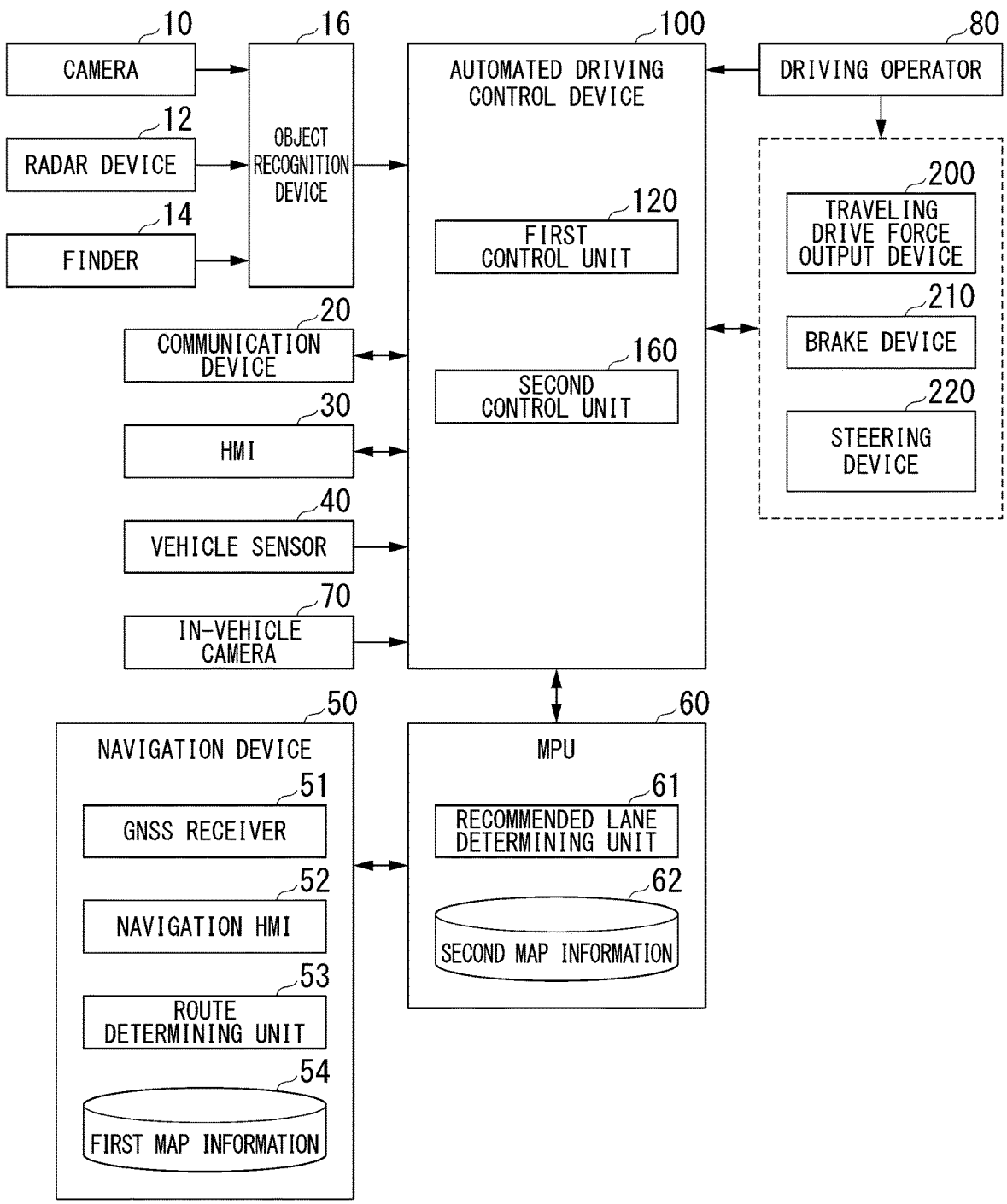
FIG. 1 is a diagram illustrating a configuration of a vehicle system using a vehicle control device according to an embodiment.

FIG. 1 is a diagram illustrating a configuration of a vehicle system 1 using a vehicle control device according to an embodiment. A vehicle having the vehicle system 1 mounted thereon is, for example, a two-wheeled, three-wheeled, or four-wheeled vehicle, and a drive source thereof is an internal combustion engine such as a diesel engine or a gasoline engine, a motor, or a combination thereof. The motor is operated by using power generated by a generator connected to the internal combustion engine or power released from a secondary battery or a fuel cell.

The vehicle system 1 includes, for example, a camera 10, a radar device 12, a finder 14, an object recognition device 16, a communication device 20, a human machine interface (HMI) 30, a vehicle sensor 40, a navigation device 50, a map positioning unit (MPU) 60, a driving operator 80, an automated driving control device 100, a traveling drive force output device 200, a brake device 210, and a steering device 220. The devices and the apparatuses are connected to each other via a multiplex communication line such as a controller area network (CAN) communication line, a serial communication line, or a wireless communication network. The configuration illustrated in FIG. 1 is only an example, and some of the constituents may be omitted, and other constituents may be added.

The camera 10 is a digital camera using a solid-state imaging element such as a charge coupled device (CCD) or a complementary metal oxide semiconductor (CMOS). The camera 10 is attached at any location in a vehicle (hereinafter, an own vehicle M) on which the vehicle control system 1 is mounted. In a case where the front side is imaged, the camera 10 is attached to the upper part of a front windshield, the back surface of an interior mirror, or the like. For example, the camera 10 periodically and repeatedly images the periphery of the own vehicle M. The camera 10 may be a stereo camera. The own vehicle M is an example of a "moving object".

The radar device 12 radiates electric waves such as millimeter waves in the periphery of the own vehicle M, detects electric waves (reflected waves) reflected by an object, and thus detects at least a position (a distance and an azimuth) of the object. The radar device 12 is attached at any location in the own vehicle M. The radar device 12 may detect a position and a speed of an object according to a frequency modulated continuous wave (FM-CW) method.

The finder 14 is light detection and ranging (LIDAR). The finder 14 applies light in the periphery of the own vehicle M, and measures scattered light. The finder 14 detects a distance to a target on the basis of a time from light emission to light reception. The applied light is, for example, pulsed laser light. The finder 14 is attached at any location in the own vehicle M.

The object recognition device 16 performs a sensor fusion process on detection results from some or all of the camera 10, the radar device 12, and the finder 14, and thus recognizes a position, the type, a speed, and the like of an object. The object recognition device 16 outputs a recognition result to the automated driving control device 100. The object recognition device 16 may output detection results from the camera 10, the radar device 12, and the finder 14 to the automated driving control device 100 without change. The object recognition device 16 may be omitted from the vehicle system 1.

The communication device 20 performs communication with another vehicle present in the periphery of the own vehicle M, or performs communication with various server apparatus via a wireless base station by using, for example, a cellular network, a Wi-Fi network, Bluetooth (registered trademark), or Dedicated Short Range Communication (DSRC).

The HMI 30 presents various pieces of information to an occupant of the own vehicle M, and also receives an input operation from the occupant. The HMI 30 includes various display devices, a speaker, a buzzer, a touch panel, switches, keys, and the like.

The vehicle sensor 40 includes, for example, a vehicle speed sensor detecting a speed of the own vehicle M, an acceleration sensor detecting acceleration, a yaw rate sensor detecting an angular speed about a vertical axis, and an azimuth sensor detecting an orientation of the own vehicle M.

The navigation device 50 includes, for example, a global navigation satellite system (GNSS) receiver 51, a navigation HMI 52, and a route determining unit 53. The navigation device 50 stores first map information 54 in a storage device such as a hard disk drive (HDD) or a flash memory. The GNSS receiver 51 identifies a position of the own vehicle M on the basis of a signal received from a GNSS satellite. A position of the own vehicle M may be identified or complemented by an inertial navigation system (INS) using an output from the vehicle sensor 40. The navigation HMI 52 includes a display device, a speaker, a touch panel, keys, and the like. The navigation HMI 52 may be partially or entirely integrated into the HMI 30 described above. The route determining unit 53 determines, for example, a route (hereinafter, a route on a map) from a position of the own vehicle M identified by the GNSS receiver 51 (or any entered position) to a destination that is entered by an occupant by using the navigation HMI 52 on the basis of the first map information 54. The first map information 54 is, for example, information in which a road shape is expressed by a link indicating a road and nodes connected to each other via the link. The first map information 54 may include a curvature of a road, point of interest (POI) information, and the like.

The route on the map is output to the MPU 60. The navigation device 50 may perform route guidance using the navigation HMI 52 on the basis of the route on the map. The navigation device 50 may be implemented, for example, by a function of a terminal apparatus such as a smartphone or a tablet terminal carried by the occupant. The navigation device 50 may transmit the current position and the destination to a navigation server via the communication device 20, and may acquire a route equivalent to the route on the map from the navigation server.

The MPU 60 includes, for example, a recommended lane determining unit 61, and stores second map information 62 in a storage device such as an HDD or a flash memory. The recommended lane determining unit 61 divides the route on the map provided from the navigation device 50 into a plurality of blocks (for example, divides the route on the map every 100 m in a vehicle advancing direction), and determines a recommended lane for each block by referring to the second map information 62. The recommended lane determining unit 61 determines in which lane from the left the own vehicle will travel. In a case where there is a branch location on the route on the map, the recommended lane determining unit 61 determines a recommended lane such that the own vehicle M can travel on a reasonable route to advance to a branch destination.

The second map information 62 is map information with higher accuracy than that of the first map information 54. The second map information 62 includes, for example, lane center information or lane boundary information. The second map information 62 may include road information, traffic regulation information, address information (address/postal code), facility information, telephone number information, and the like. The second map information 62 may be updated at any time by the communication device 20 performing communication with other devices.

The driving operator 80 includes, for example, an accelerator pedal, a brake pedal, a shift lever, a steering wheel, an odd-shaped steering wheel, a joystick, and other operators. The driving operator 80 is attached with a sensor detecting an operation amount or whether or not an operation is performed, and a detection result is output to the automated driving control device 100 or some or all of the traveling drive force output device 200, the brake device 210, and the steering device 220.

The automated driving control device 100 is an example of a vehicle control device. The automated driving control device 100 includes, for example, a first control unit 120 and a second control unit 160. Each of the first control unit 120 and the second control unit 160 is realized, for example, by a hardware processor such as a central processing unit (CPU) executing a program (software). Some or all of the constituents may be realized by hardware (a circuit portion; including a circuitry) such as a large scale integration (LSI), an application specific integrated circuit (ASIC), a field-programmable gate array (FPGA), or a graphics processing unit (GPU), and may be realized by software and hardware in cooperation. The program may be stored in advance in a storage device (a storage device provided with a non-transitory storage medium) such as an HDD or a flash memory of the automated driving control device 100, and may be stored in an attachable and detachable storage medium (non-transitory storage medium) such as a DVD or a CD-ROM and may be installed in the HDD or the flash memory of the automated driving control device 100 when the storage medium is attached to a drive device.

Figure 2:
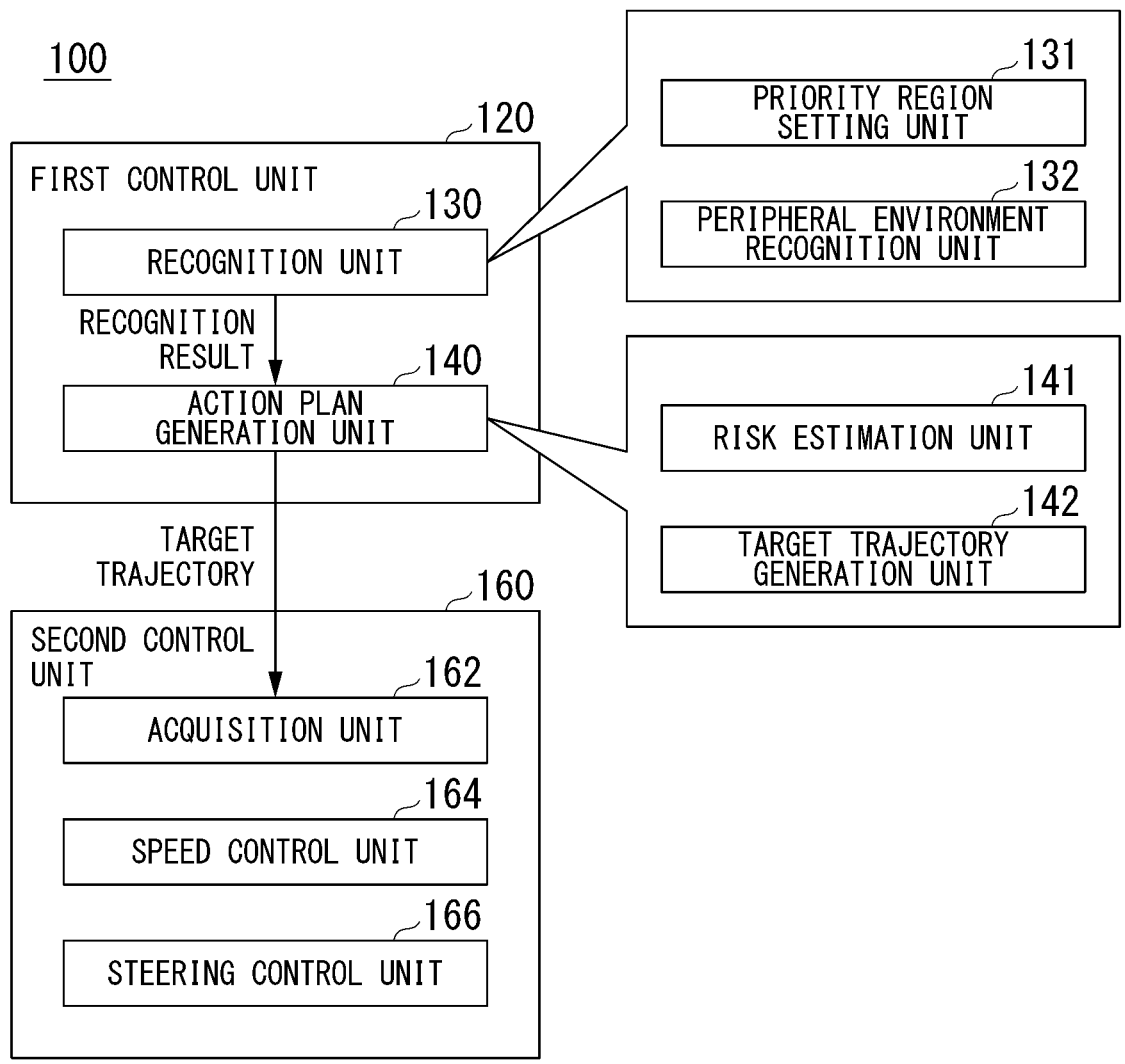
FIG. 2 is a diagram illustrating functional configurations of a first control unit and a second control unit.

FIG. 2 is a diagram illustrating a functional configuration of the first control unit and the second control unit. The first control unit 120 includes, for example, a recognition unit 130 and an action plan generation unit 140. The first control unit 120 is realized by combining, for example, a function of artificial intelligence (AI) with a function of a model provided in advance. For example, a function of "recognizing an intersection" may be realized by executing recognition of the intersection using deep learning and recognition based on conditions (for example, there are a signal that can be matched with a pattern, and a road marking) given in advance in parallel, and scoring and comprehensively evaluating both of recognition results. Consequently, the reliability of automated driving is ensured.

The recognition unit 130 includes, for example, a priority region setting unit 131 and a surrounding environment recognition unit 132. The priority region setting unit 131 sets a priority region on which a recognition process is preferentially performed among recognition regions that are recognizable on the basis of information that is input from the camera 10, the radar device 12, and the finder 14 via the object recognition device 16. Details of a process of the priority region setting unit 131 setting a priority region will be described later. The priority region is a region to which traffic participants are required to pay special attention when the vehicle M travels, and is a region provided at an intersection, for example.

The surrounding environment recognition unit 132 recognizes states of a target, such as a position, a speed, and an acceleration in the vicinity of the own vehicle M on the basis of information that is input from the camera 10, the radar device 12, and the finder 14 via the object recognition device 16. The target includes a traffic participant such as a pedestrian or a bicycle. The position of the target is recognized as, for example, a position in an absolute coordinate system having a representative point (for example, the centroid or the drive axis center) of the own vehicle M as an origin, and is used for control. The position of the target may be represented by a representative point such as the centroid or a corner of the target, and may be represented by an expressed region. The "states" of the target may include an acceleration, a jerk, or an "action state" of the target (for example, the target is trying to cross lanes or whether or not the target is trying to cross lanes). For example, the surrounding environment recognition unit 132 preferentially performs a recognition process on a priority region set by the priority region setting unit 131 among recognition regions, and performs a recognition process on recognition regions other than the priority region after performing the recognition process on the priority region.

The action plan generation unit 140 includes, for example, a risk estimation unit 141 and a target trajectory generation unit 142. Either or both of the risk estimation unit 141 and the target trajectory generation unit 142 may be included in the recognition unit 130.

The target trajectory generation unit 142 generates one or more temporary target trajectories on which the own vehicle M automatedly (regardless of an operation of a driver) travels in the future such that the own vehicle can travel in a recommended lane determined by the recommended lane determining unit 61 in principle and can cope with a peripheral situation of the own vehicle M. The target trajectory generation unit 142 determines, as a target trajectory, a temporary target trajectory along which the own vehicle M is not required to be suddenly turned in a case where the own vehicle M travels along the temporary target trajectory among the one or more generated temporary target trajectories.

In a scene in which a risk is estimated by the risk estimation unit 141, the target trajectory generation unit 142 determines a target trajectory from among one or more temporary target trajectories on the basis of a risk for the own vehicle M estimated for each temporary target trajectory by the risk estimation unit 141. Details thereof will be described later.

The target trajectory and the temporary target trajectory are expressed, for example, by sequentially arranging locations (trajectory points) to be reached by a representative point (for example, the front end part center, the centroid, or the rear wheel shaft center) of the own vehicle M in a longitudinal direction of a road every predetermined distance (for example, about several meters). The target trajectory is added with a target speed and a target acceleration for each predetermined sampling time (for example, any of about 0.1 to 0.9 seconds). The trajectory point may be a location to be reached by the own vehicle M at a sampling time point every predetermined sampling time. In this case, information regarding the target speed or the target acceleration is expressed by an interval between the trajectory points.

The second control unit 160 controls the traveling drive force output device 200, the brake device 210, and the steering device 220 such that the own vehicle M can pass along the target trajectory generated by the action plan generation unit 140 as scheduled.

The second control unit 160 includes, for example, an acquisition unit 162, a speed control unit 164, and a steering control unit 166. The acquisition unit 162 acquires information regarding the target trajectory (trajectory point) generated by the action plan generation unit 140, and stores the information in a memory (not illustrated). The speed control unit 164 controls the traveling drive force output device 200 or the brake device 210 on the basis of a speed element included in the target trajectory stored in the memory. The steering control unit 166 controls the steering device 220 according to a curved state of the target trajectory stored in the memory. Processes in the speed control unit 164 and the steering control unit 166 are realized by a combination of, for example, feedforward control and feedback control. As an example, the steering control unit 166 executes a combination of feedforward control based on a curvature of a road in front of the own vehicle M and feedback control based on deviation from the target trajectory.

The traveling drive force output device 200 outputs traveling drive force (torque) for traveling of the vehicle to drive wheels. The traveling drive force output device 200 includes, for example, a combination of an internal combustion engine, a motor, and a transmission, and an electronic control unit (ECU) controlling the constituents. The ECU controls the constituents according to information that is input from the second control unit 160 or information that is input from the driving operator 80.

The brake device 210 includes, for example, a brake caliper, a cylinder that transmits hydraulic pressure to the brake caliper, an electric motor that generates the hydraulic pressure in the cylinder, and a brake ECU. The brake ECU controls the electric motor on the basis of information being input from the second control unit 160 or information being input from the driving operator 80, so that brake torque corresponding to a braking operation is output to each vehicle wheel. The brake device 210 may include a mechanism, as a backup, transmitting hydraulic pressure generated by operating the brake pedal included in the driving operator 80, to the cylinder via a master cylinder. The brake device 210 may be an electronic control type hydraulic brake device that controls an actuator according to information being input from the second control unit 160 and thus transmits hydraulic pressure in a master cylinder to the cylinder.

The steering device 220 includes, for example, a steering ECU and an electric motor. The electric motor changes an orientation of a turning wheel by applying force to, for example, a rack-and-pinion mechanism. The steering ECU drives the electric motor on the basis of information being input from the second control unit 160 or information being input from the driving operator 80, so that an orientation of the turning wheel is changed.

Setting of Priority Region

Hereinafter, a method of setting a priority region will be described in more detail.

The priority region setting unit 131 determines whether or not there is a target region on which the risk estimation unit 141 will perform a risk estimation process among recognition regions recognized by the surrounding environment recognition unit 132. The region on which the risk estimation process will be performed is, for example, an intersection region CR at which a road that is present on a recommended route in an advancing direction of the own vehicle M intersects a road including a lane in which the own vehicle M is traveling and lanes adjacent to the lane, or is a region that is an intersection nearby region NCR separated from the intersection region CR by a predetermined distance and in which a crosswalk CW is present. Hereinafter, the road including the lane in which the own vehicle M is traveling and the lanes adjacent thereto will be referred to as a "first road", and the road that is present in the advancing direction of the own vehicle M on the recommended route in the first road will be referred to as a "second road".

In a case where there is the target region on which the risk estimation unit 141 will perform the risk estimation process in the recognition regions, the priority region setting unit 131 sets a priority region for each of one or more temporary target trajectories trT generated by the target trajectory generation unit 142.

Figure 3:
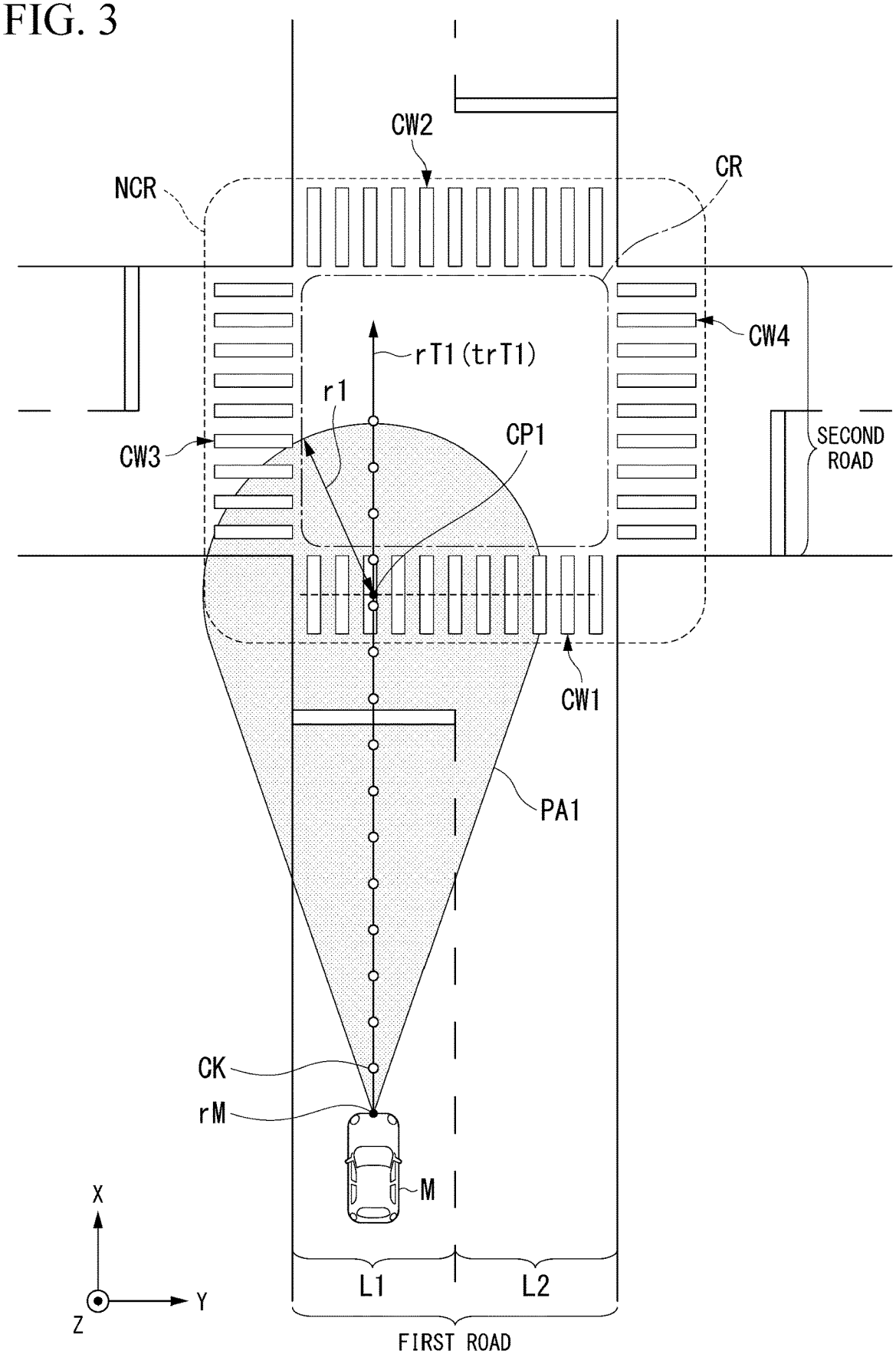
FIG. 3 is a diagram for describing a priority region in a case where there is a single crosswalk intersecting a temporary target trajectory.

Priority Region in Case where there is Single Crosswalk Intersecting Recommended Route FIG. 3 is a diagram for describing a priority region in a case where there is a single crosswalk that intersects a temporary target trajectory trT1. In the following description, X indicates an extending direction of a road, and Y indicates a vehicle width direction orthogonal to the X direction. The +X direction indicates an advancing direction of the own vehicle M, the −X direction indicates behind the own vehicle M, the −Y direction indicates a leftward direction with respect to the advancing direction of the own vehicle M, and the +Y direction indicates a rightward direction with respect to the advancing direction of the own vehicle M.

As described above, in principle, the target trajectory generation unit 142 sets a central line in a recommended lane (in FIG. 3, a lane L1) determined by the recommended lane determining unit 61 as a recommended route rT1, and generates one or more temporary target trajectories trT such that the own vehicle travels along the recommended route rT1. In FIG. 3, cK indicates a candidate point. The target trajectory generation unit 142 generates, as the temporary target trajectory trT, a trajectory connected to a position (that is, the candidate point cK) to which the own vehicle M will travel in the future in an automated manner (regardless of an operation of a driver) in the X direction in a case where the own vehicle will travel along the recommended route rT1. For convenience of description, among the one or more temporary target trajectories trT, only the temporary target trajectory trT superimposed on the recommended route rT is illustrated in FIG. 3. Therefore, FIG. 3 illustrates only the temporary target trajectory trT1 superimposed on the recommended route rT1 among the one or more temporary target trajectories trT.

The target trajectory generation unit 142 may set a line biased to either the right or the left in a recommended lane, as the recommended route rT. In a curved road, the recommended route has a curved shape. In a case where the action plan generation unit 140 causes the own vehicle M to change lanes, a route along which the own vehicle is directed from a certain lane to another lane adjacent thereto may be set as the recommended route rT.

First, the priority region setting unit 131 determines whether or not the intersection region CR is included in recognition results from the surrounding environment recognition unit 132. Next, in a case where it is determined that the intersection region CR is included in the recognition region, the priority region setting unit 131 determines whether or not there is a crosswalk in the intersection region CR or the intersection nearby region NCR at a position separated from the intersection region CR by a predetermined distance. The intersection nearby region NCR is an example of the "vicinity of an intersection region". In FIG. 3, the intersection nearby region NCR includes four crosswalks CW such as a crosswalk CW1 at a position closest to the own vehicle M, a crosswalk CW2 in the +X direction from the crosswalk CW1, a crosswalk CW3 located in the −Y direction from the own vehicle M on the second road, and a crosswalk CW4 located in the +Y direction from the own vehicle M on the second road.

In a case where it is determined that there is a crosswalk in the intersection region CR or the intersection nearby region NCR, the priority region setting unit 131 assumes that there is a target region on which a risk estimation process will be performed, and sets a region overlapping the crosswalk as a priority region PA1. The priority region setting unit 131 sets, as the priority region PA1, for example, a region obtained by combining a circular region having a radius r1 centering on an intersection position CP1 where the temporary target trajectory trT1 intersects the center of the crosswalk CW1 in a width direction with a region inside two different tangential lines drawn from a representative point rM of the own vehicle M, related to the circle.

A shape of the priority region PA1 is not limited thereto, and the priority region setting unit 131 may set the priority region PA1 including a region having a shape other than a circular shape centering on the intersection position CP1. For example, the priority region setting unit 131 may set the priority region PA1 including an elliptical region having a direction of crossing the crosswalk CW as a major axis centering on the intersection position CP1. The priority region setting unit 131 may not set the priority region PA with respect to the intersection position CP as long as the region overlaps the crosswalk CW present in the intersection region CR or the intersection nearby region NCR.

Figure 4:
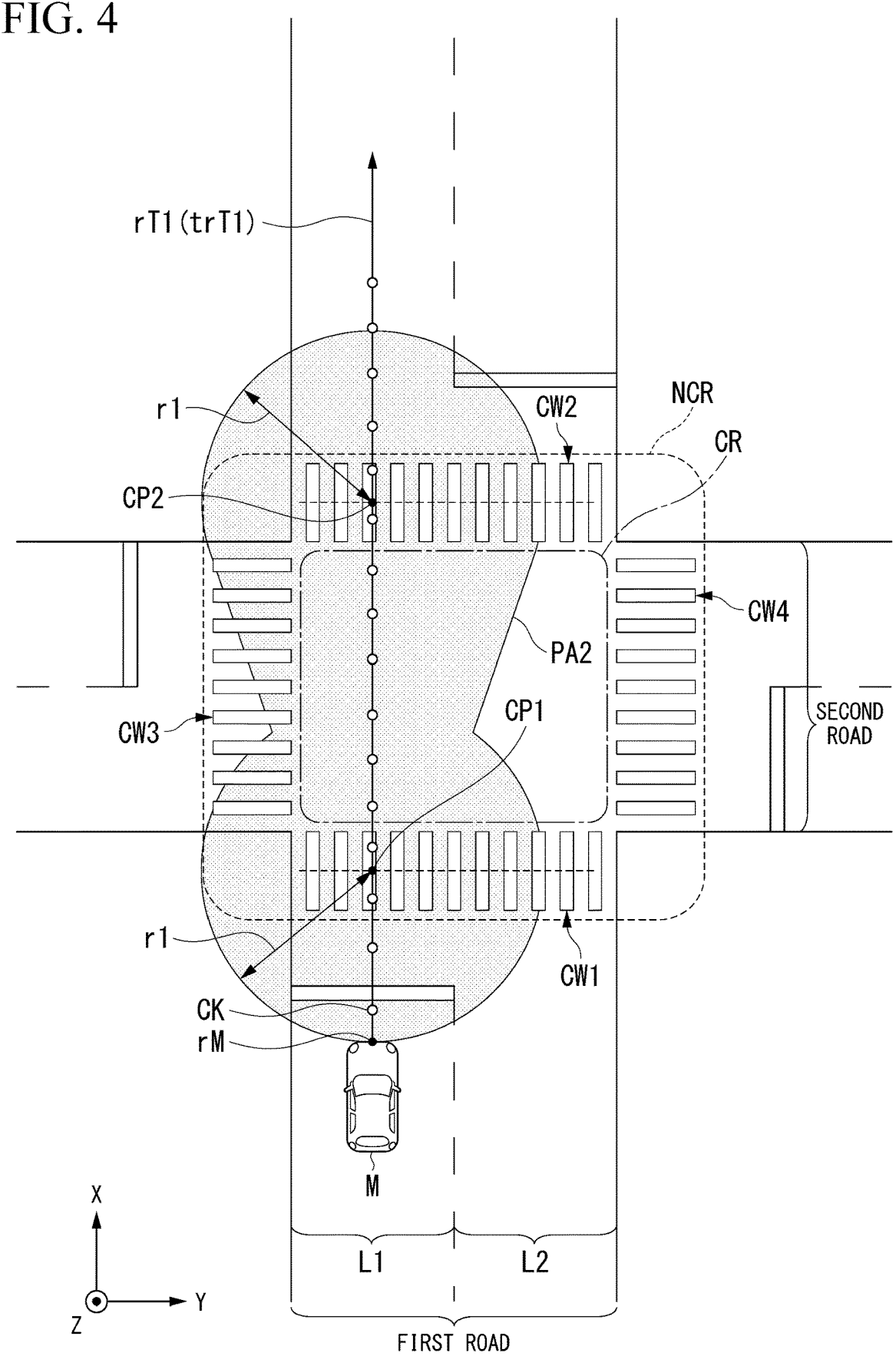
FIG. 4 is a diagram for describing a priority region in a case where there are a plurality of crosswalks intersecting a temporary target trajectory.

Priority Region in Case where there are Plural Crosswalks Intersecting Recommended Route FIG. 4 is a diagram for describing a priority region in a case where there are a plurality of crosswalks intersecting the temporary target trajectory trT1. In FIG. 3, there only one crosswalk CW intersecting the temporary target trajectory trT1, that is, the crosswalk CW1. In FIG. 4, since the own vehicle M has advanced further in the X direction than in the scene in FIG. 3, there are two crosswalks CW intersecting the temporary target trajectory trT1, that is, the crosswalk CW1 and the crosswalk CW2. In this case, the priority region setting unit 131 sets a priority region PA2 by combining a circular region having a radius r1 centering on an intersection position CP2 where the temporary target trajectory trT1 intersects the center of the crosswalk CW2 in a width direction, separated from the position of the own vehicle M, a region inside two different tangential lines drawn from the representative point rM of the own vehicle M, related to the circle, and a circular region having the radius r1 centering on the intersection position CP1 where the temporary target trajectory trT1 intersects the center of the crosswalk CW1 in the width direction, close to the position of the own vehicle M with each other.

The circular shape centering on the intersection position CP1 and the circular shape centering on the intersection position CP2 may be circular shapes having different radii.

Priority Region in Case where Recommended Route is not Straight

Figure 5:
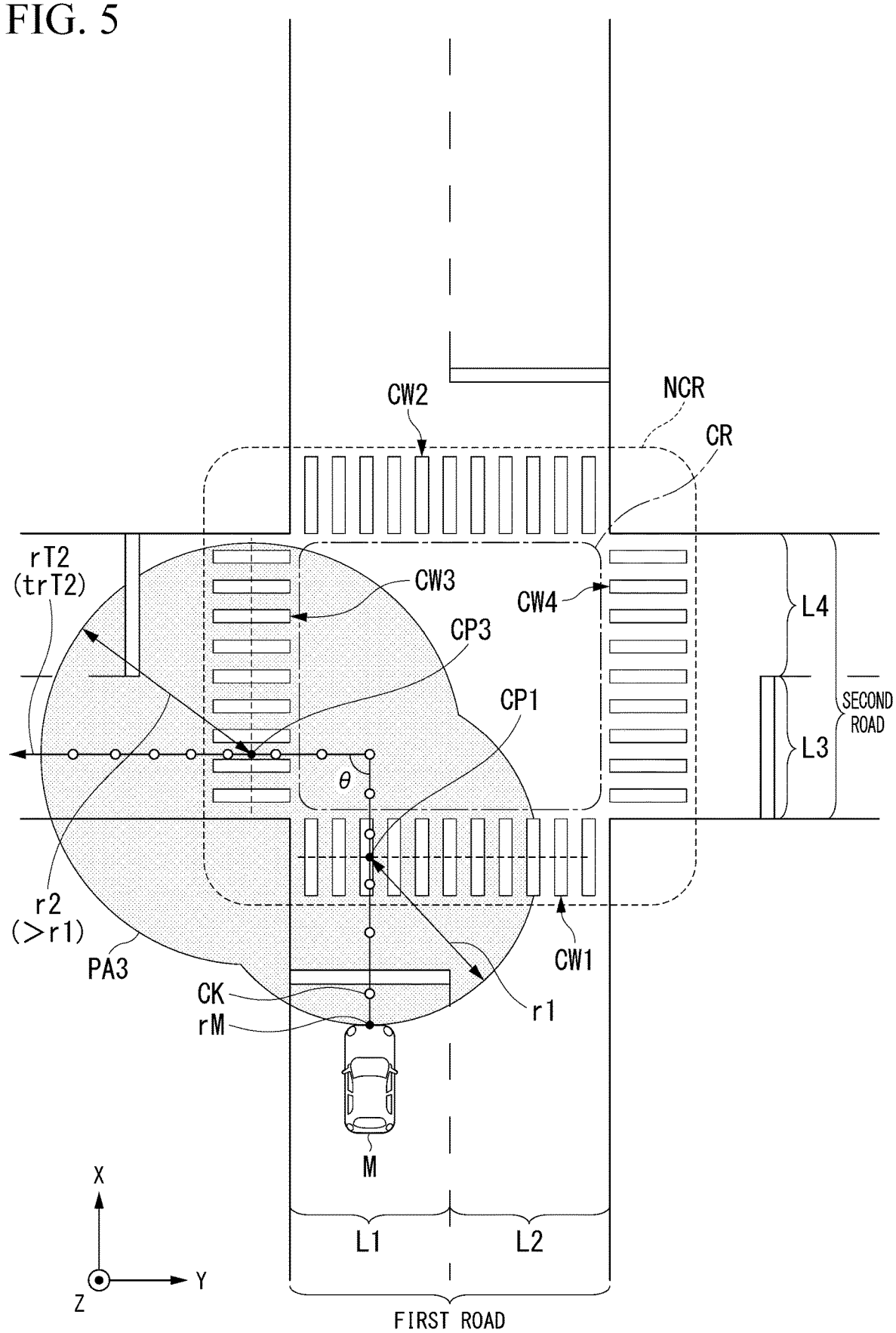
FIG. 5 is a diagram for describing a priority region related to a temporary target trajectory other than advancing straight ahead.

FIG. 5 is a diagram for describing a priority region related to a temporary target trajectory trT2 other than advancing straight ahead. In FIG. 5, the own vehicle M is turned left at the intersection region CR, and travels on the second road in the −Y direction. Thus, the target trajectory generation unit 142 sets a central line in recommended lanes (L1 to L3 in FIG. 5) determined by the recommended lane determining unit 61 as a recommended route rT2, and generates the temporary target trajectory trT2 such that the own vehicle travels along the recommended route rT2.

The priority region setting unit 131 changes an aspect of the priority region PA according to the degree of turning of the temporary target trajectory trT2. For example, the priority region setting unit 131 enlarges the priority region PA as the degree of turning of a target trajectory becomes larger. Hereinafter, the degree of turning of a target trajectory is assumed to be an angle θ formed between the lane L1 in which the own vehicle M is currently traveling and the lane L3 in which the own vehicle M will travel in the future. For example, as the angle θ is increased, the priority region setting unit 131 increases the radius r of a circular region included in the priority region PA. In a case where there are a plurality of crosswalks intersecting the temporary target trajectory trT2, the priority region setting unit 131 increases the radius r of a circular region overlapping the crosswalk CW3 separated from the position of the own vehicle M.

In FIG. 5, there are two crosswalks CW intersecting the temporary target trajectory trT2, that is, the crosswalk CW1 and the crosswalk CW3. In this case, the priority region setting unit 131 sets a priority region PA3 by combining a circular region having a radius r2 centering on an intersection position CP3 where the temporary target trajectory trT2 intersects the center of the crosswalk CW3 in a width direction, separated from the position of the own vehicle M, a region inside two different tangential lines drawn from the representative point rM of the own vehicle M, related to the circle, and a circular region having the radius r1 centering on the intersection position CP1 where the temporary target trajectory trT2 intersects the center of the crosswalk CW1 in the width direction, close to the position of the own vehicle M with each other. Here, a relationship between the radius r1 and the radius r2 is the radius r1<the radius r2.

The priority region setting unit 131 may increase the radii r of all circular regions centering on the intersection positions CP at crosswalks intersecting the temporary target trajectory trT according to the degree of turning related to the temporary target trajectory trT. For example, the priority region setting unit 131 may set radii of both of the circular region centering on the intersection position CP3 and the circular region centering on the intersection position CP1 related to the temporary target trajectory trT2 to the radius r2, and may set a radius of one thereof (for example, the circular region centering on the intersection position CP1 or the circular region centering on the intersection position CP3) to the radius r2.

The priority region setting unit 131 may change an aspect of the priority region PA according to a state of the own vehicle M. For example, as a speed of the own vehicle M becomes lower, the priority region setting unit 131 may enlarge the priority region PA. As the recognition accuracy of the surrounding environment recognition unit 132 becomes lower due to a surrounding environment (for example, due to weather conditions such as rainfall, heavy fog, and snow) of the own vehicle M, the priority region setting unit 131 may enlarge the priority region PA.

Risk Estimation

Hereinafter, a detailed description will be made of a method of estimating a risk for the own vehicle M.

As described above, the priority region PA set by the priority region setting unit 131 is a region to which a traffic participant pays special attention when the own vehicle M travels through the intersection region CR. Therefore, the risk estimation unit 141 performs a process (hereinafter, referred to as a first estimation process) of estimating a risk on the basis of a recognition result of the priority region PA set for each temporary target trajectory trT among recognition results of recognition regions, and performs a process (second estimation process) of estimating a risk on the basis of the recognition results of the recognition regions other than the priority region PA after the first estimation process is performed. Hereinafter, details of the first estimation process will be described. The second estimation process is the same as a process related to general contact avoidance, and thus description thereof will be omitted.

For example, in a case where a traffic participant is present in the priority region PA, a traffic participant is advancing toward the priority region PA, or a traffic participant is present in the vicinity of the priority region PA, the risk estimation unit 141 estimates a risk for the own vehicle M to be high with respect to traveling along the temporary target trajectory trT related to the priority region PA, and estimates the risk for the own vehicle M to be low in a case where these conditions are not satisfied.

Figure 6:
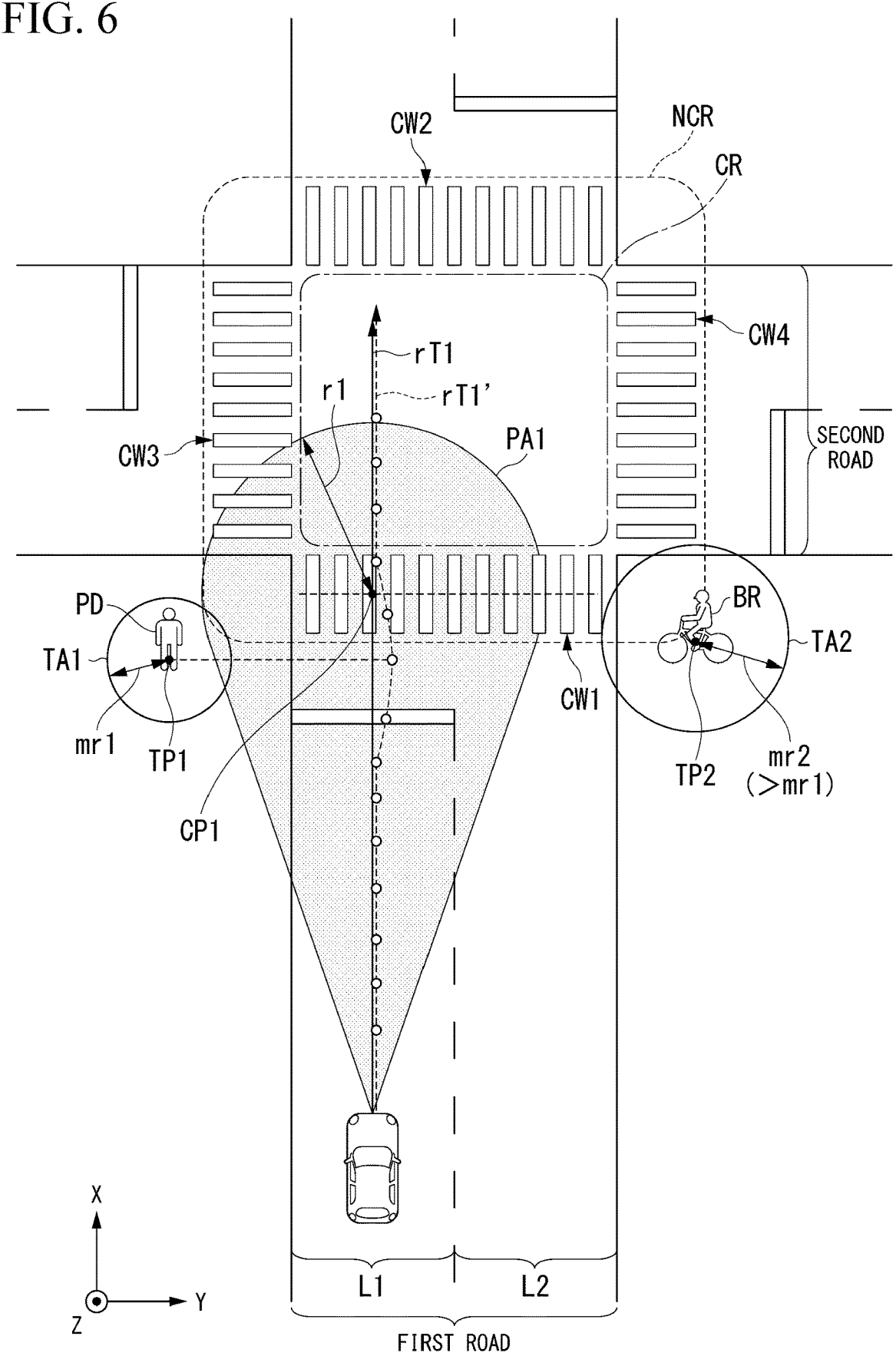
FIG. 6 is a diagram used for describing a risk estimation process.

Hereinafter, the risk estimation unit 141 is assumed to estimate a risk by using an estimation index for estimating a risk for the own vehicle M (hereinafter, a risk index value). FIG. 6 is a diagram used for describing a risk estimation process. First, the risk estimation unit 141 identifies a traffic participant that is advancing toward the priority region PA and is estimated to enter the priority region PA at a time point at which the own vehicle M reaches the priority region PA or a predetermined time period (centering on the time point) in which the own vehicle M reaches the priority region PA. Hereinafter, in a case where a time point at which the own vehicle M will reach the priority region PA and a predetermined time period centering on the time point are not differentiated from each other, they will be referred to as a "prediction timing".

Next, the risk estimation unit 141 identifies, for example, an attribute of the traffic participant recognized by the surrounding environment recognition unit 132. In this case, the attribute is, for example, a property of the traffic participant related to a movement speed. For example, the risk estimation unit 141 identifies a corresponding attribute of the recognized traffic participant among attributes such as a pedestrian, a bicycle, a woman, a man, an adult, a child, and an old man or woman on the basis of a recognition result from the surrounding environment recognition unit 132. The contents of the attribute are only examples, and are not limited thereto.

Next, the risk estimation unit 141 estimates a prediction target region TA to which it is assumed the traffic participant will move before the prediction timing according to the identified attribute. The risk estimation unit 141 estimates, as the prediction target region TA, for example, a circular region having a movement radius mr centering on a position of the identified traffic participant (hereinafter, a target position TP). Here, the attribute is correlated with the movement radius mr corresponding to a movement speed of the traffic participant in advance, and the risk estimation unit 141 estimates the prediction target region TA having the movement radius mr corresponding to the identified attribute of the traffic participant. The movement radius mr becomes longer as a movement speed of the traffic participant having the corresponding attribute becomes higher. Changing the movement radius mr according to an attribute of a traffic participant is an example of changing a length of the "predetermined time period".

In the above description, a description has been made of a case where the prediction target region TA is a circular region, but the prediction target region is not limited thereto. The risk estimation unit 141 may estimate, for example, the prediction target region TA having an elliptical shape in which a movement direction of the traffic participant is set as a major axis.

In FIG. 6, traffic participants including a pedestrian PD trying to cross the crosswalk CW1 from the −Y direction and a bicycle BR trying to cross the crosswalk CW1 from the +Y direction are present at an intersection where the first road and the second road intersect each other. The risk estimation unit 141 estimates a prediction target region TA1 having a movement radius mr1 centering on a target position TP1 of the pedestrian PD. The risk estimation unit 141 estimates a circular prediction target region TA2 having a movement radius mr2 centering on a target position TP2 of the bicycle BR. Here, a relationship between the movement radius mr1 and the movement radius mr2 is the movement radius mr1<the movement radius mr2.

Figure 7:
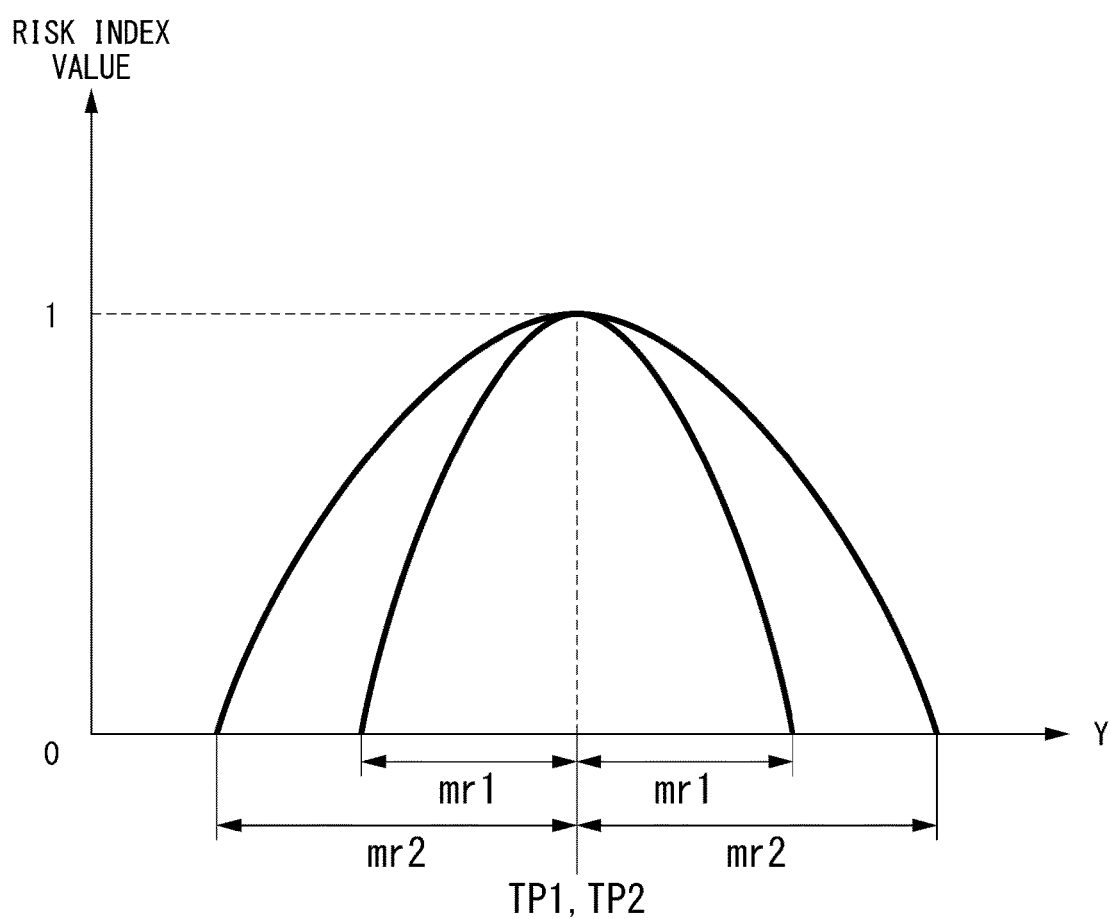
FIG. 7 is a diagram illustrating an example of a content of distribution information.

The risk estimation unit 141 estimates the prediction target region TA of a traffic participant, and determines whether or not the prediction target region TA is superimposed on the priority region PA. In a case where the prediction target region TA is superimposed on the priority region PA, the risk estimation unit 141 calculates a risk index value on the basis of a superimposition degree and distribution information. FIG. 7 is a diagram illustrating an example of a content of distribution information. The distribution information is, for example, information indicating a distribution of a risk index value in the prediction target region TA for each attribute. As illustrated in FIG. 7, the risk index value is set to "1" at the target position TP, becomes smaller toward a position increasingly separated from the target position TP, and is set to "0" at the position of the movement radius mr from the target position TP. The risk estimation unit 141 estimates a risk for the own vehicle M to become higher as the risk index value becomes greater (that is, as the target position TP comes closer to the priority region PA), and estimates a risk for the own vehicle M to become lower as the risk index value becomes smaller (that is, as the target position TP becomes more distant from the priority region PA). The risk estimation unit 141 identifies a position farthest from the target position TP in a region where the prediction target region TA is superimposed on the priority region PA. The risk estimation unit 141 acquires the risk index value on the basis of a distance from the identified position to the target position TP and the distribution information. The risk estimation unit 141 performs the process of acquiring the risk index value for each temporary target trajectory trT.

The target trajectory generation unit 142 determines, as a target trajectory, the temporary target trajectory trT in which a risk index value acquired by the risk estimation unit 141 is smallest or the temporary target trajectory trT that is equal to or less than a predetermined threshold value among one or more temporary target trajectories trT.

Here, the number of obstacles is not limited to one. In a case where a recognition result from the surrounding environment recognition unit 132 indicates that a plurality of traffic participants are present in a region where the prediction target region TA is superimposed on the priority region PA, the risk estimation unit 141 estimates the prediction target region TA for each traffic participant, superimposes the prediction target regions on a road plane, and uses a sum of risk index values related to the prediction target regions TA as a risk index value in a case where both of the prediction target region TA based on a first traffic participant and the prediction target region TA based on a second traffic participant are superimposed at a certain location of the priority region PA. Since a traffic participant is not limited to standing still, the risk estimation unit 141 may derive a risk index value by taking into consideration the passage of time.

Operation Flow

Figure 8:
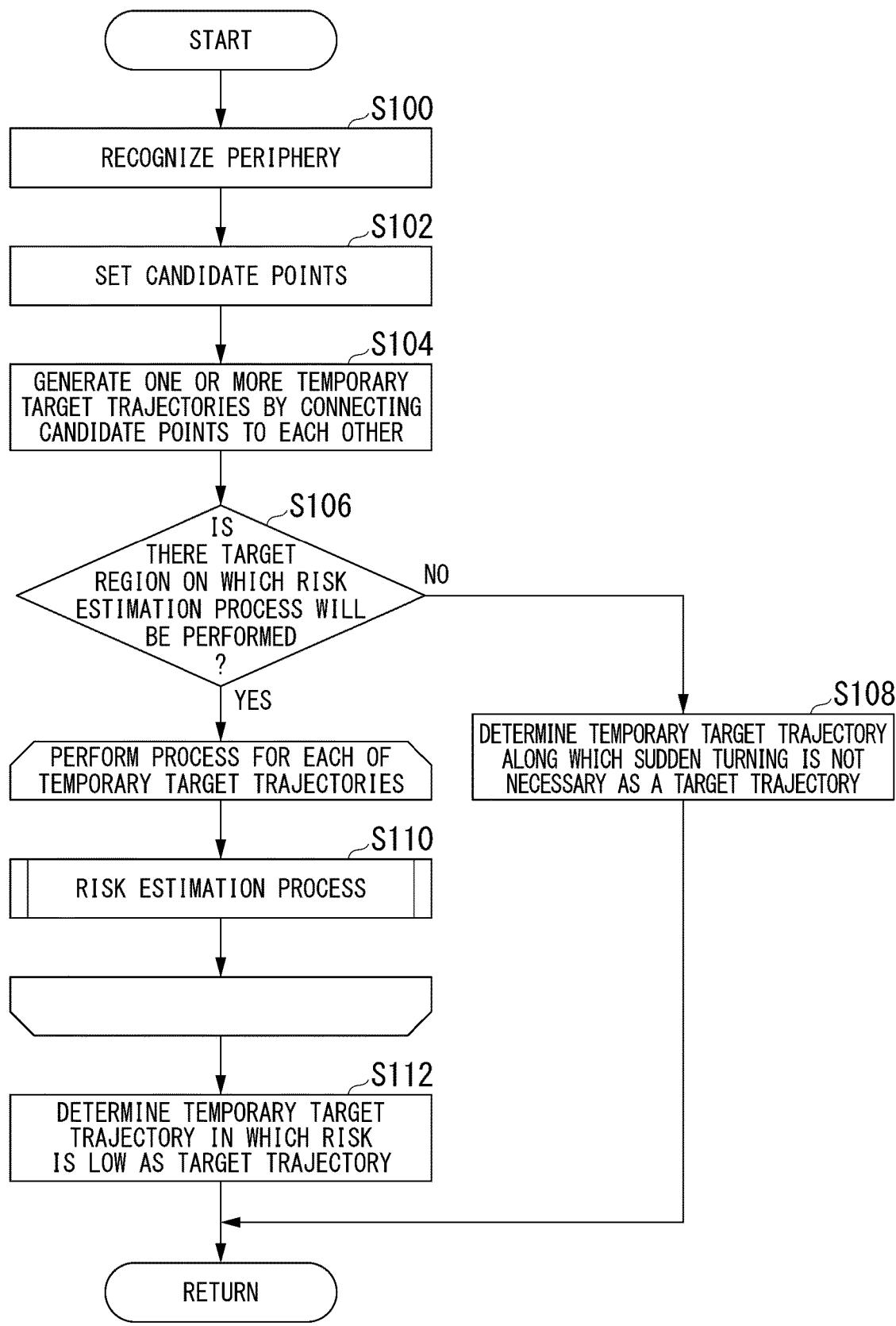
FIG. 8 is a flowchart illustrating an example of a process in an automatic driving control device.

FIG. 8 is a flowchart illustrating an example of a process in the automated driving control device 100. First, the surrounding environment recognition unit 132 recognizes the periphery of the own vehicle M (step S100). Next, the target trajectory generation unit 142 sets the candidate points cK on the basis of a recognition result from the surrounding environment recognition unit 132 (step S102). Next, the target trajectory generation unit 142 generates one or more temporary target trajectories trT by connecting the candidate points cK to each other in an advancing direction of the own vehicle M (step S104). Next, the priority region setting unit 131 determines whether or not there is a target region on which the risk estimation unit 141 will perform a risk estimation process in the advancing direction of the own vehicle M (step S106). Specifically, the priority region setting unit 131 determines whether or not the intersection region CR is included in the recognition result from the surrounding environment recognition unit 132. In a case where it is determined that the intersection region CR is included in a recognition region, the priority region setting unit 131 determines whether or not there is a crosswalk in the intersection region CR or the intersection nearby region NCR. In a case where it is determined that there is a crosswalk in the intersection region CR or the intersection nearby region NCR, the priority region setting unit 131 determines that there is a target region on which the risk estimation process will be performed.

In a case where the priority region setting unit 131 determines that there is no target region on which the risk estimation process will be performed, the target trajectory generation unit 142 determines the temporary target trajectory trT along which sudden turning is not necessary as a target trajectory, and finishes the process (step S108). In a case where the priority region setting unit 131 determines that there is a target region on which the risk estimation process will be performed, the risk estimation unit 141 performs the risk estimation process on some or all of the one or more temporary target trajectories trT generated by the target trajectory generation unit 142 for each of the temporary target trajectories trT (step S110). Specifically, the risk estimation unit 141 acquires a risk index value as the risk estimation process. Details of the process in step S110 will be described later. The target trajectory generation unit 142 determines the temporary target trajectory trT in which a risk estimated by the risk estimation unit 141 is lowest as a target trajectory (step S112).

Figure 9:
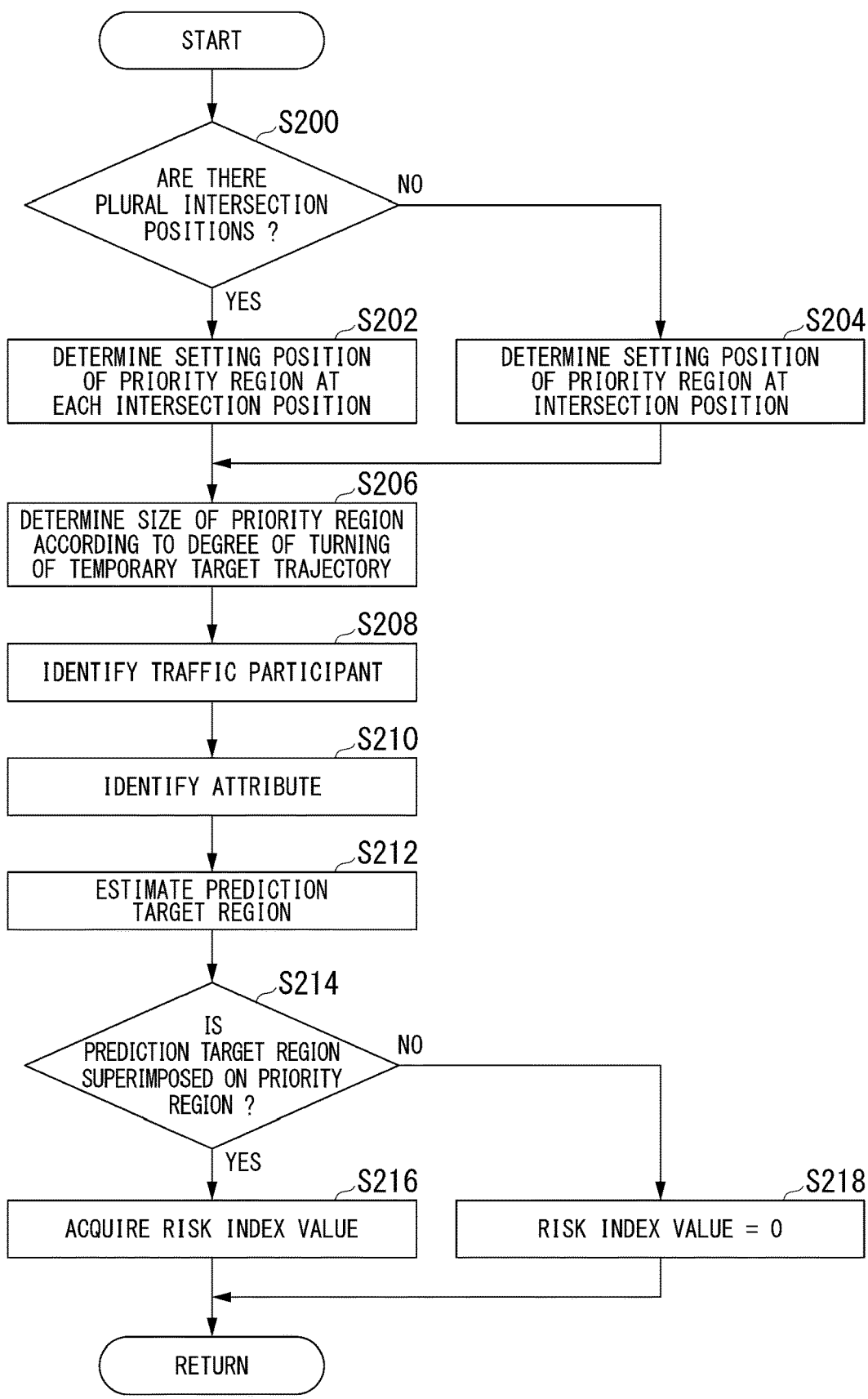
FIG. 9 is a flowchart illustrating an example of a process in step S110 illustrated in FIG. 8.

FIG. 9 is a flowchart illustrating an example of the process in step S110 illustrated in FIG. 8. As described above, the automated driving control device 100 executes processes in step S200 to S218 illustrated in FIG. 9 on some or all of the temporary target trajectories trT generated in step S104.

First, the priority region setting unit 131 determines whether or not there are a plurality of intersection positions CP at which the temporary target trajectory trT intersects the center of the crosswalk CW in the width direction in the intersection region CR (step S200). In a case where it is determined that there are a plurality of intersection positions CP, the priority region setting unit 131 determines to set the priority region PA including all regions (for example, circular regions having the radii r centering on the intersection positions CP) related to the intersection positions CP (step S202). In a case where it is determined that there are no plurality of intersection positions CP, the priority region setting unit 131 determines to set the priority region PA with respect to any intersection position CP (step S204). The priority region setting unit 131 determines a size of the priority region PA according to the degree of turning of the temporary target trajectory trT (step S206). For example, as the degree of turning of the temporary target trajectory trT becomes higher, the priority region setting unit 131 increases of a size of the priority region PA (for example, the radius r of a circular region centering on the intersection position CP is increased).

The risk estimation unit 141 identifies a traffic participant that is present in the priority region PA or in the vicinity of the priority region PA (step S208). Next, the risk estimation unit 141 identifies an attribute of the identified traffic participant (step S210). Next, the risk estimation unit 141 determines the movement radius mr of the prediction target region TA to which the traffic participant moves before a predetermined timing according to the identified attribute of the traffic participant, and estimates the prediction target region TA (step S212).

Next, the risk estimation unit 141 determines whether or not the set prediction target region TA is superimposed on the priority region PA set by the priority region setting unit 131 (step S214). In a case where it is determined that the prediction target region TA is superimposed on the priority region PA, the risk estimation unit 141 calculates a risk index value for the temporary target trajectory trT related to the prediction target region TA on the basis of a superimposition degree and distribution information (step S216). In a case where it is determined that the prediction target region TA is not superimposed on the priority region PA, the risk estimation unit 141 treats a risk for the own vehicle M to be low with respect to the traffic participant related to the prediction target region TA, and sets a risk index value related to the temporary target trajectory trT to "0" (step S218).

Summary of Embodiment

According to the automated driving control device 100 of the above-described embodiment, the priority region setting unit 131 sets the priority region PA superimposed on the crosswalk CW in the intersection region CR or the intersection nearby region NCR, the risk estimation unit 141 estimates a risk for the own vehicle M with respect to a traffic participant that enters the priority region PA or is present in the vicinity of the priority region PA at a prediction timing, and thus it is possible to perform a recognition process on the traffic participant with high accuracy without greatly increasing a processing load at an intersection.

According to the automated driving control device 100 of the embodiment, since a traffic participant present at a position away from the intersection region CR comes close to the own vehicle M as a speed of the own vehicle M becomes lower, the priority region PA is set to be wider as a speed of the own vehicle M becomes lower, and thus it is possible to recognize a traffic participant that enters the priority region PA or is present in the vicinity of the priority region PA at a predetermined timing, with high accuracy.

According to the automated driving control device 100 of the embodiment, the surrounding environment recognition unit 132 performs a recognition process on the priority region PA and then performs a recognition process on recognition regions other than the priority region PA, and thus it is possible to preferentially perform a recognition process on the intersection region CR at which the own vehicle M is estimated to intersect a course of a traffic participant, and a range of the intersection nearby region NCR.

According to the automated driving control device 100 of the embodiment, the priority region setting unit 131 enlarges the priority region PA according to the degree of turning of the temporary target trajectory trT, and thus it is possible to perform a recognition process on a range that is difficult for recognized by the surrounding environment recognition unit 132 to recognize with high accuracy.

According to the automated driving control device 100 of the embodiment, the risk estimation unit 141 estimates a risk related to a traffic participant that is estimated to enter the priority region PA at a prediction timing, and thus it is possible to perform a recognition process on a traffic participant of which a course is estimated to intersect the own vehicle, with high accuracy.

According to the automated driving control device 100 of the embodiment, the risk estimation unit 141 identifies an attribute of a traffic participant on the basis of a recognition result from the surrounding environment recognition unit 132, and changes the movement radius mr of the prediction target region TA according to the identified attribute, and thus it is possible to perform a recognition process according to a feature of the traffic participant.

Recognition Process on Priority Region PA and Recognition Region Other than Priority Region PA The surrounding environment recognition unit 132 may make information used for a recognition process on a priority region set by the priority region setting unit 131 among recognition regions and information used for a recognition process on the recognition regions other than the priority region different from each other. For example, the surrounding environment recognition unit 132 may use an image generated by the camera 10 for a recognition process on a priority region and may use an image of which an information amount is reduced (compressed, for example) compared with the image for a recognition process on recognition regions other than the priority region. In this case, the surrounding environment recognition unit 132 may reduce an information amount of an image generated by the camera 10. Consequently, the automated driving control device 100 of the present embodiment can reduce a processing load in a recognition process on a recognition region other than a priority region. The image generated by the camera 10 is an example of a "first image", and the image obtained by reducing an information amount of the image generated by the camera 10 is an example of a "second image".

Information Used for Recognition Process

In the above description, a description has been made of a case where the surrounding environment recognition unit 132 recognizes a surrounding environment of the own vehicle M on the basis of information that is input from the camera 10, the radar device 12, and the finder 14 via the object recognition device 16, but this is only an example. The surrounding environment recognition unit 132 may recognize a surrounding environment of the own vehicle M by using, for example, an image that is acquired from an external device via the communication device 20 and is obtained by imaging the intersection region CR or the intersection nearby region NCR. In this case, the external device is, for example, a periphery monitoring device installed on a sidewalk close to the priority region, and the periphery monitoring device includes a camera, and transmits information indicating an image generated by the camera imaging the intersection region CR, the intersection nearby region NCR, and a sidewalk in the vicinity thereof to the own vehicle M present near the installation position of the camera via a network. Consequently, the surrounding environment recognition unit 132 of the automated driving control device 100 of the present embodiment can perform a recognition process on a traffic participant with high accuracy even at a location at which it is difficult for the priority region PA to be recognized by the surrounding environment recognition unit 132.

Configuration of Estimation Device

In the above description, a description has been made of a case where the automated driving control device 100 performs a process of estimating a risk for the own vehicle M with respect to a traffic participant and causes the own vehicle M to travel through automated driving according to an estimated result, but this is only an example. Among the functional units of the automated driving control device 100, an estimation device including functional units such as the priority region setting unit 131, the surrounding environment recognition unit 132, and the risk estimation unit 141 may perform a risk estimation process and output an estimated result to the automated driving control device 100. In this case, the target trajectory generation unit 142 of the automated driving control device 100 generates a target trajectory on the basis of the estimated result output from the estimation device, and causes the own vehicle M to travel through automated driving.

Hardware Configuration

Figure 10:
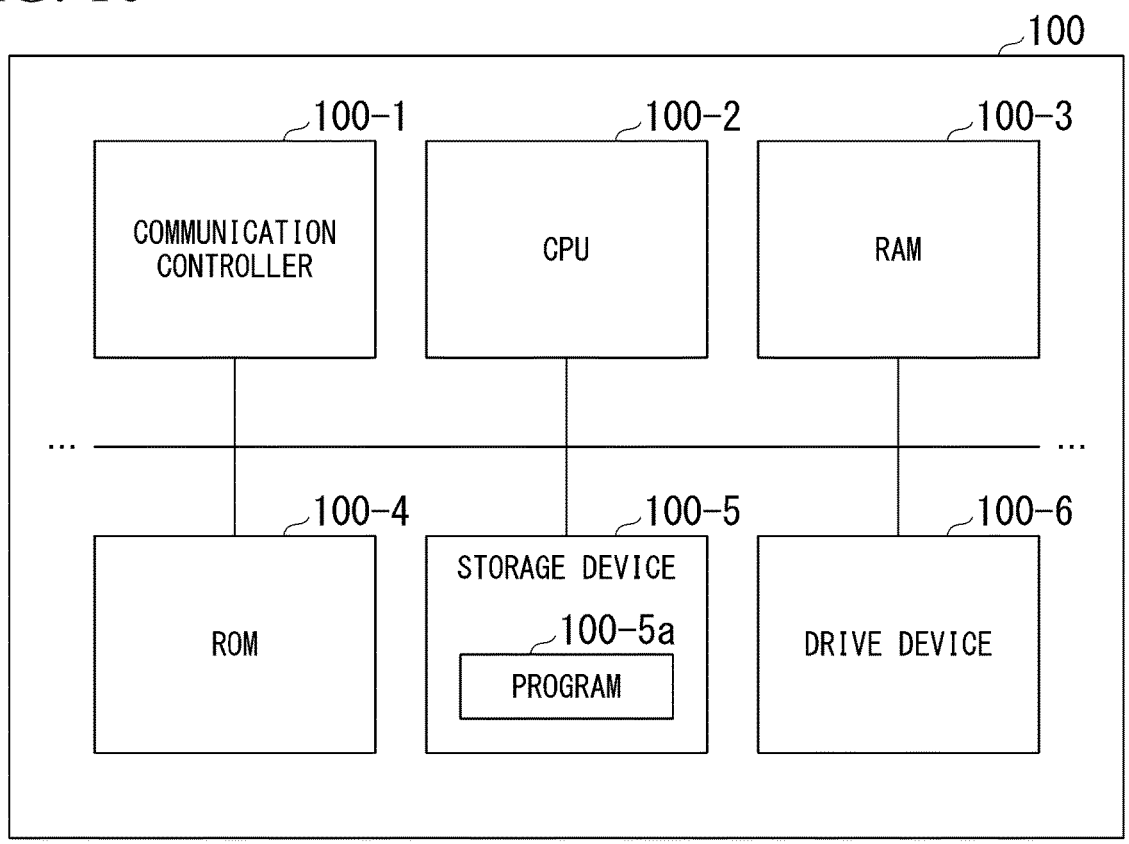
FIG. 10 is a diagram illustrating an example of a hardware configuration of the automated driving control device of the embodiment.

FIG. 10 is a diagram illustrating an example of a hardware configuration of the automated driving control device 100 of the embodiment. As illustrated, the automated driving control device 100 is configured to include a communication controller 100-1, a CPU 100-2, a random access memory (RAM) 100-3 used as a working memory, a read only memory (ROM) 100-4 storing a boot program or the like, a storage device 100-5 such as a flash memory or an hard disk drive (HDD), and a drive device 100-6 that are connected to each other via an internal bus or a dedicated communication line. The communication controller 100-1 performs communication with constituents other than the automated driving control device 100. The storage device 100-5 stores a program 100-5a executed by the cup 100-2. The program is loaded to the RAM 100-3 by a direct memory access (DMA) controller (not illustrated), and is executed by the CPU 100-2. Consequently, either or both of the first control unit 120 and the second control unit 160 are realized.

The embodiment may be expressed as follows.

A vehicle control device includes a storage device storing a program, and a hardware processor, in which the hardware processor executes the program stored in the storage device, and thus recognizes a surrounding environment of a moving object in recognition regions, estimates a risk for the moving object on the basis of a recognition result, sets a priority region on which a recognition process is preferentially performed among the recognition regions, according to a state of the surrounding environment of the moving object, and sets, as the priority region, a region overlapping a region including at least a part of at least one crosswalk that is present in a vicinity of an intersection region in which a first road on which the moving object is located intersects a second road present in an advancing direction of the moving object.

As mentioned above, the mode for carrying out the present invention has been described by using the embodiment, but the present invention is not limited to the embodiment, and various modifications and replacements may occur within the scope without departing from the spirit of the present invention.

What is claimed is:

1. An estimation device comprising:
   a recognition unit configured to recognize a surrounding environment of a moving object in recognition regions; and
   an estimation unit configured to estimate a risk for the moving object on the basis of a recognition result from the recognition unit,
   wherein the recognition unit
      sets a priority region on which a recognition process is preferentially performed among the recognition regions, according to a state of the surrounding environment of the moving object, and
      sets, as the priority region, a region overlapping a region including at least a part of at least one crosswalk that is present in a vicinity of an intersection region in which a first road on which the moving object is located intersects a second road present in an advancing direction of the moving object,
   wherein the recognition unit enlarges a range of the priority region as a speed of the moving object becomes lower.

2. The estimation device according to claim 1,
   wherein the recognition unit sets the priority region with an intersection position where the advancing direction of the moving object intersects the at least one crosswalk as a reference.

3. The estimation device according to claim 1, wherein the estimation unit performs a first estimation process of estimating a risk for the priority region, and performs a second estimation process of estimating risks for regions other than the priority region among the recognition regions after performing the first estimation process.

4. The estimation device according to claim 3, wherein the recognition unit recognizes the surrounding environment on the basis of an image generated through imaging in a camera,
   wherein the estimation unit performs the first estimation process by using a first image obtained by the camera imaging the priority region, and performs the second estimation process by using a second image obtained by the camera imaging regions other than the priority region among the recognition regions, and
   wherein an information amount of the second image is smaller than an information amount of the first image.

5. The estimation device according to claim 1, wherein the recognition unit enlarges the priority region as a degree of turning of a target trajectory becomes larger on the basis of the target trajectory of the moving object.

6. The estimation device according to claim 1, wherein the estimation unit estimates a risk related to a traffic participant that is advancing toward the priority region and is estimated to enter the priority region in a predetermined time period centering on a time point at which the moving object reaches the priority region.

7. The estimation device according to claim 6, wherein the estimation unit identifies an attribute of the traffic participant on the basis of a recognition result from the recognition unit, and changes a length of the predetermined time period according to the identified attribute.

8. The estimation device according to claim 1, wherein the recognition unit recognizes the surrounding environment of the moving object further on the basis of a recognition result of the priority region being recognized by a periphery monitoring device provided on a sidewalk close to the priority region.

9. The estimation device according to claim 1, wherein the recognition unit sets a plurality of the priority regions according to a target trajectory of the moving object and the speed of the moving object.

10. An estimation method of causing a computer to:
recognize a surrounding environment of a moving object in recognition regions;
estimate a risk for the moving object on the basis of a recognition result;
set a priority region on which a recognition process is preferentially performed among the recognition regions, according to a state of the surrounding environment of the moving object;
set, as the priority region, a region overlapping a region including at least a part of at least one crosswalk that is present in a vicinity of an intersection region in which a first road on which the moving object is located intersects a second road present in an advancing direction of the moving object; and
enlarge a range of the priority region as a speed of the moving object becomes lower.

11. A non-transitory computer readable storage medium storing a program causing a computer to:
recognize a surrounding environment of a moving object in recognition regions;
estimate a risk for the moving object on the basis of a recognition result;
set a priority region on which a recognition process is preferentially performed among the recognition regions, according to a state of the surrounding environment of the moving object;
set, as the priority region, a region overlapping a region including at least a part of at least one crosswalk that is present in a vicinity of an intersection region in which a first road on which the moving object is located intersects a second road present in an advancing direction of the moving object; and
enlarge a range of the priority region as a speed of the moving object becomes lower.

12. An estimation device comprising:
a recognition unit configured to recognize a surrounding environment of a moving object in recognition regions; and
an estimation unit configured to estimate a risk for the moving object on the basis of a recognition result from the recognition unit,
wherein the recognition unit
sets a priority region on which a recognition process is preferentially performed among the recognition regions, according to a state of the surrounding environment of the moving object, and
sets, as the priority region, a region overlapping a region including at least a part of at least one crosswalk that is present in a vicinity of an intersection region in which a first road on which the moving object is located intersects a second road present in an advancing direction of the moving object, and
wherein the recognition unit enlarges the priority region as a degree of turning of a target trajectory becomes larger on the basis of the target trajectory of the moving object.

13. An estimation method of causing a computer to:
recognize a surrounding environment of a moving object in recognition regions;
estimate a risk for the moving object on the basis of a recognition result;
set a priority region on which a recognition process is preferentially performed among the recognition regions, according to a state of the surrounding environment of the moving object;
set, as the priority region, a region overlapping a region including at least a part of at least one crosswalk that is present in a vicinity of an intersection region in which a first road on which the moving object is located intersects a second road present in an advancing direction of the moving object; and
enlarge the priority region as a degree of turning of a target trajectory becomes larger on the basis of the target trajectory of the moving object.

14. A non-transitory computer readable storage medium storing a program causing a computer to:
recognize a surrounding environment of a moving object in recognition regions;
estimate a risk for the moving object on the basis of a recognition result;
set a priority region on which a recognition process is preferentially performed among the recognition regions, according to a state of the surrounding environment of the moving object;
set, as the priority region, a region overlapping a region including at least a part of at least one crosswalk that is present in a vicinity of an intersection region in which a first road on which the moving object is located intersects a second road present in an advancing direction of the moving object; and
enlarge the priority region as a degree of turning of a target trajectory becomes larger on the basis of the target trajectory of the moving object.

* * * * *